(12) United States Patent
Varzhabedian

(10) Patent No.: US 7,547,990 B2
(45) Date of Patent: Jun. 16, 2009

(54) BACKUP POWER SYSTEM FOR ELECTRICAL APPLIANCES

(76) Inventor: Diran Varzhabedian, 601 Cove Rd., Stamford, CT (US) 06902

( * ) Notice: Subject to any disclaimer, the term of this patent is extended or adjusted under 35 U.S.C. 154(b) by 0 days.

(21) Appl. No.: 11/804,087

(22) Filed: May 17, 2007

(65) Prior Publication Data
US 2007/0228835 A1    Oct. 4, 2007

Related U.S. Application Data

(63) Continuation-in-part of application No. 11/179,842, filed on Jul. 12, 2005.

(51) Int. Cl.
- *H02H 3/00* (2006.01)
- *H02H 1/06* (2006.01)
- *H02J 7/00* (2006.01)
- *H02J 9/00* (2006.01)

(52) U.S. Cl. ......................................................... 307/66

(58) Field of Classification Search .................. None
See application file for complete search history.

(56) References Cited

U.S. PATENT DOCUMENTS

| | | | |
|---|---|---|---|
| 5,612,580 A | 3/1997 | Janonis et al. | |
| 6,169,669 B1 * | 1/2001 | Choudhury | 363/37 |
| 6,680,547 B1 * | 1/2004 | Dailey | 307/31 |
| 2004/0125626 A1 | 7/2004 | Kanouda et al. | |
| 2005/0134121 A1 | 6/2005 | Lathrop et al. | |
| 2006/0072262 A1 * | 4/2006 | Paik et al. | 361/62 |

* cited by examiner

*Primary Examiner*—Stephen W Jackson
*Assistant Examiner*—Adi Amrany (57) ABSTRACT

A backup power system for household or structural appliances that normally receives power from a primary power source, and is not an uninterruptible power system. Included are batteries, a battery charger, a power interface interconnecting the primary power source and the backup power system, power relays that comprise a switching matrix of individually operating relays that connect and disconnect the sources and appliances one and only one at a time, sensing devices to monitor the currents and voltages, conversion of the DC voltage of the batteries to AC voltage for backup power to the appliances, circuitry for preventing peak power demands by delivering sequentially selected appliances, one and only one at a time and only when power is demanded by each individually selected appliance, thereby prolonging the operating lifetime of fully charged batteries. Short circuit protection is provided to protect the backup power system from appliance short circuits, and to protect the batteries in the event of a short circuit within the system.

4 Claims, 8 Drawing Sheets

BACKUP POWER SYSTEM FOR ELECTRICAL APPLIANCES

Continuation in part for application Ser. No. 11/179,842, originally filed on 12 Jul. 2005.

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The invention relates to a backup electrical power system for household and structural appliances such as, but not limited to, refrigerators, freezers, furnaces and ancillary equipment, well pumps, and other like appliances.

2. Prior Art

All of the aforementioned appliances rely upon electrical power for operation. Primary electrical power, generated at a remote power generating plant, is provided to households and structures along power lines. On occasion, power outages occur for a variety of reasons including failure of a power grid or power transformer, power line damage resulting from vehicles colliding into poles carrying power lines, lightning strikes, and in many other ways. In the event of a power outage, household and structural appliances are deprived of their operating power and are rendered useless.

Through the years, many systems have been proposed, some of which have been, and are, presently marketed, to operate as a temporary replacement of the primary electrical power system during power outages. For example, a popular system has been gasoline or propane driven motor-generator sets. Solar energy and wind-driven generators have also been used, as have battery-operated inverters.

Gasoline operated motor-generator sets present serious problems, such as safety, fuel supply, and environmental pollution. For example, fuel storage is a serious safety consideration and may be in violation of fire codes under certain circumstances. Also, when the fuel supply is depleted, replenishing the fuel supply may not be possible due to the fact that sources of gasoline may not be able to pump gasoline because of the power outage.

Environmental considerations include the excessive amount of acoustical noise generated, and the exhausting of combustion products into the atmosphere from the engine. This is also true for propane fuel systems.

Except for the most expensive systems, most motor-generator systems require an external transfer switch that adds additional labor and material costs for installation. In addition, if no one is available during an outage to effect the transfer from primary power to backup power, and to start the motor-generator set, the advantage becomes moot. There are motor-generator sets that incorporate these necessities but their cost is prohibitive for most households.

Harvesting solar and wind energy are other sources, however both require an enormous physical structure in order to serve in a viable manner. Storage of energy by these generators requires expensive batteries and extensive electronic control equipment. And, these sources are very expensive, eliminating their practicability for the average homeowner.

The use of battery-operated DC to AC inverters is a viable alternative. Two directions have been taken to implement batteries. The uninterruptible power supply is one such direction. An uninterruptible power supply provides electrical power by means of a battery-driven DC to AC inverter that is always on line, that is, the uninterruptible power supply continuously generates power, even when primary electrical power is available, while a battery charger is continuously charging the battery. In this manner, in the event of a power outage, the uninterruptible power supply continues to provide power. This system is valuable to computer users since there cannot be loss of data during switchover that may take several milliseconds.

While this system eliminates the drawbacks of the systems described above, there are four disadvantages for using this system. First of all, batteries have a predictable lifetime depending upon the number of charge/discharge cycles and the depth of discharge, resulting in relatively early replacement. Secondly, for practical reasons of cost, size, and weight, the length of time an uninterruptible power supply can provide electrical power during a power outage is severely limited, certainly less than 15 to 30 minutes, at best, just long enough to save work in process before shutting down. The third reason is that the size and cost of such systems to endure a typical outage is enormous. Lastly, only limited power can be generated within the constraints of size, weight, and cost.

Unlike the uninterruptible power supply, a different type of battery-operated system has been proposed wherein the battery is on standby when primary power is available, and provides energy only during power outages. Heretofore, all these systems begin to generate backup power in the event of a power outage, providing electrical energy to all household and structural appliances simultaneously. This system, however, has a very limited operating time also, and requires greater electrical power to be generated in order to supply the peak power demands of appliances when supplied simultaneously. Peak power demands severely stress both the batteries and the backup power system, resulting in a shorter available operating lifetime of fully charged batteries.

None of the patents searched provide a means of maximizing the length of time batteries can provide power since they all begin generating power when a power failure occurs, and power is supplied to all appliances simultaneously.

3. Objects And Advantages

The above clearly defines the need for a system that can supply electrical power in the event of failure of the source of primary power, and doing so in a cost effective and viable way. Therefore, in the present invention, backup electrical power is delivered to household or structural appliances in a manner that circumvents all of the disadvantages cited above, and does so efficiently and effectively, maximizing the operating lifetime of fully charged batteries.

SUMMARY OF THE INVENTION

Whereas in presently available backup power systems all appliances receive backup power simultaneously when primary power fails, the uniqueness of the present invention is that this backup power system delivers power to household or structural appliances sequentially, one and only one of a plurality of appliances receiving power at a time, circumventing peak power demands.

The dwell time during which backup power is delivered to one and only one of a plurality of appliances is pre-settable and depends upon tests performed on the current drawn, at the time of selection, of each one and only one of a plurality of appliances.

DRAWINGS—FIGURES

The preferred embodiment of the present invention will be described by referring to FIGS. 1 through 8.

DRAWINGS-REFERENCE NUMERALS

| | |
|---|---|
| 01 | Mains Power Panel |
| 02 | Backup Power System |
| 03 | Power Interface |
| 04 | Battery Charger |
| 05 | Batteries |
| 06 | Control and Timing |
| 07 | Inverter |
| 08 | Current Sensing |
| 09 | Voltage Sensing |
| 10 | Display |
| 11 | Primary Power Input Lines |
| 12 | Backup Power Output Lines |
| 13 | Relay Select Lines |
| 14 | Primary Power Failed Signal |
| 15 | Backup Load Current Sense Lines |
| 16 | Battery Charging Voltage |
| 17 | Primary Power Sensing Line |
| 18 | Battery Output Voltage |
| 19 | Inverter Enable/Disable Signal |
| 20 | Batteries Depleted Signal |
| 21 | Backup Power Voltage |
| 22 | Battery Status Signal |
| 23 | AC Interconnect Terminals |
| 24 | Power Relays |
| 25 | Main DC Circuit Breaker |
| 26 | DC Source Terminals |
| 27 | Battery Positive |
| 28 | Switched Battery Positive |
| 29 | Inverter DC Voltage Input |
| 30 | Inverter Frequency Signal |
| 31 | Oscillator and Divider Chain |
| 32 | Dwell Time |
| 33 | Time Slot Generator |
| 34 | Relay Select Lines |
| 35 | Relay Drivers |
| 36 | System Clock |
| 37 | Battery Status |
| 38 | Slot Duration Clock |
| 39 | Slot Advance Clock |
| 40 | Slot Counter Gate |
| 41 | Inhibit |
| 42 | Current Comparator |
| 43 | Backup Power Voltage Lines |
| 44 | Voltage Reference |
| 45 | Voltage Standard Signal |

-continued

DRAWINGS-REFERENCE NUMERALS

| | |
|---|---|
| 46 | Voltage Comparator |
| 47 | Display Status Lines |
| 48 | LED Drivers |
| 49 | Voltage Level Signal |
| 50 | Inhibit Operation Gate |
| 51 | Disable Inverter |
| 52 | System Clock |
| 53 | Current Sensor Output |
| 54 | High-Gain Amplifier/Rectifier |
| 55 | Sensed Current DC Level |
| 56 | Current Comparator |
| 57 | Voltage Regulator |
| 58 | Current Calibration Standard |
| 59 | Class D Amplifier |
| 60 | 60 Hz Square Wave Signal |
| 61 | Low-Pass Filter |
| 62 | 60 Hz Sine Wave Signal |
| 63 | Mosfet Drive Signals |
| 64 | Power Mosfets |
| 65 | Power Drive Lines |
| 66 | Inverter Output Transformer |
| 67 | Bridge Rectifier |
| 68 | Rectified Line Voltage |
| 69 | EMI/RFI Filter |
| 70 | Current and Voltage Controls |
| 71 | Buck Drive Signals |
| 72 | Pulse Width Modulator |
| 73 | Output Mosfet Drive |
| 74 | Charger Output Mosfet |
| 75 | Flyback Drive Lines |
| 76 | Flyback Transformer and Rectifier |

DETAILED DESCRIPTION

The present invention relates to a backup power system primarily for delivering backup power to household or structural appliances typically, but not limited to, a furnace, refrigerator, freezer, or water pump.

In the event of failure of the source of primary power, appliances become inoperative. As a result, essential utilities are not available for the duration of the power failure. Inconveniences may include loss of refrigerated or frozen food, lack of heat, loss of water where water is pumped locally, and other similar services.

The purpose of the present invention is to reduce the inconveniences resulting from the loss of electrical power. The stated purpose is met by supplying an alternate source of electrical power during a power outage. Normal power is generally provided by a commercial power generating station with power lines connecting the generating station with households and structures. These external power lines generally terminate in a mains power panel located at each household or structure. The present invention provides a viable alternative for use by the most essential appliances.

The preferred embodiment of the present invention will be described by referring to the attached drawings, FIGS. 1 through 8.

Figure 1:
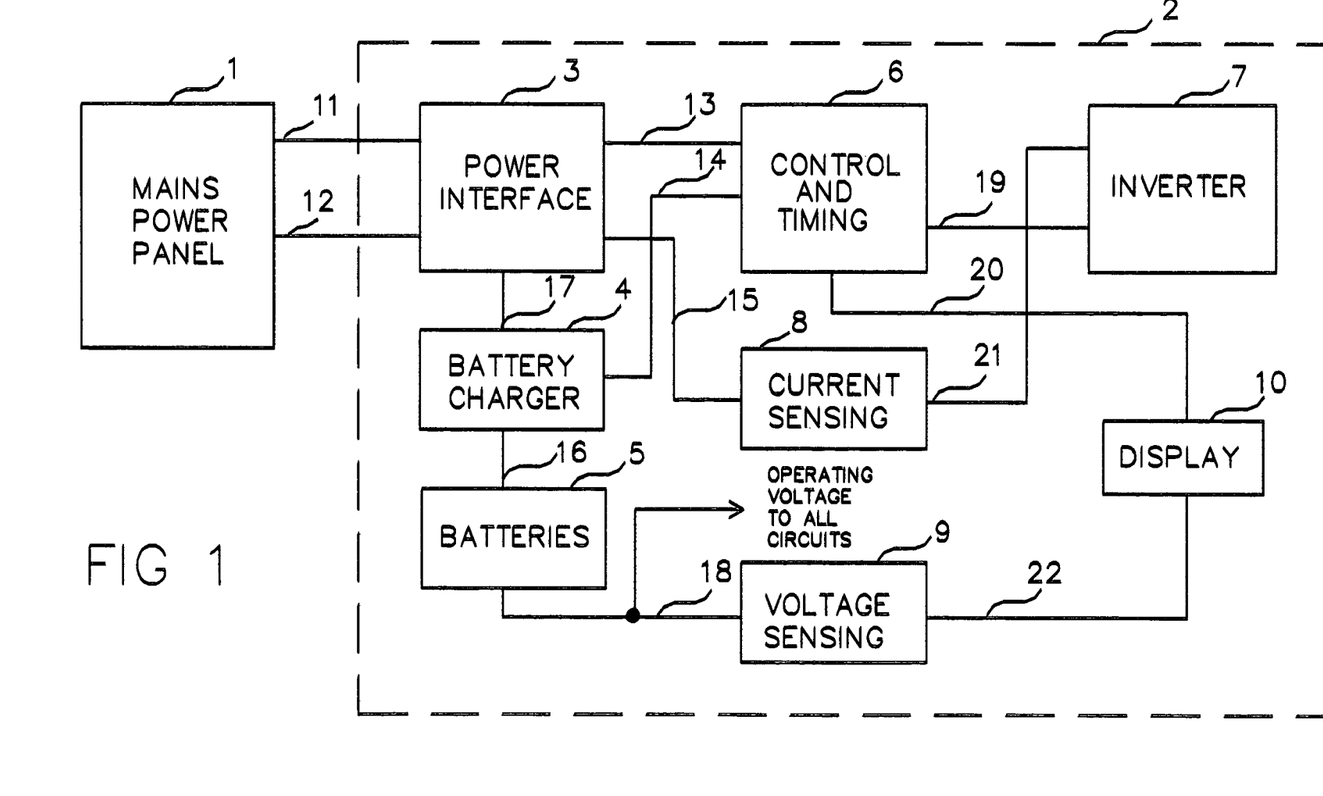
FIG. 1 illustrates the various component parts comprising the backup power system.

FIG. 1 illustrates the embodiment of the present invention that comprises the components of the backup power system. These components are power interface 3, timing and control logic 6, batteries 5, battery charger 4, current sensing logic 8, display 10, voltage sensing logic 9, and inverter 7. Batteries 5 may, or not, be external to the physical backup power system although they are an integral, and necessary, part of its operation.

Mains electrical panel 1 serves as a distribution point between the primary power source and the normal household or structure. Primary power input lines 11 provide 120 volt and 240 volt AC power to the backup system. Backup power output lines 12 provide 120 volt and 240 volt backup power output to the selected appliances during a power failure, on a one and only one of a plurality of appliances at a time basis.

In the present invention, power interface 3 serves a dual purpose. First of all, wires from and to mains electrical panel 1 are preferably terminated in blocks. The second purpose of power interface 3 is to serve as a switching matrix to switch household or structural appliances between the source of primary power and the generated backup power when a power failure is detected.

The switching matrix comprises "n" number of single-pole, double-throw (SPDT) power relays, where "n" is the number of appliances to receive backup power. In the normal configuration, the wiper of each individual relay is wired to an individual appliance, the normally-closed (NC) contact is wired to the circuit breaker assigned to that individual appliance, and the normally-open (NO) contact of that individual relay is wired to the backup power voltage.

During normal operation, i.e., no primary power failure, all individual relays are de-energized and each individual circuit breaker provides power through its associated individual relay's NC contacts to its associated appliance.

In the event of failure of primary power, one and only one individual relay, of a plurality of relays, is energized and backup power is delivered through the NO contacts (closed during power failure) of the selected relay out to the appliance associated with that relay.

Figure 2:
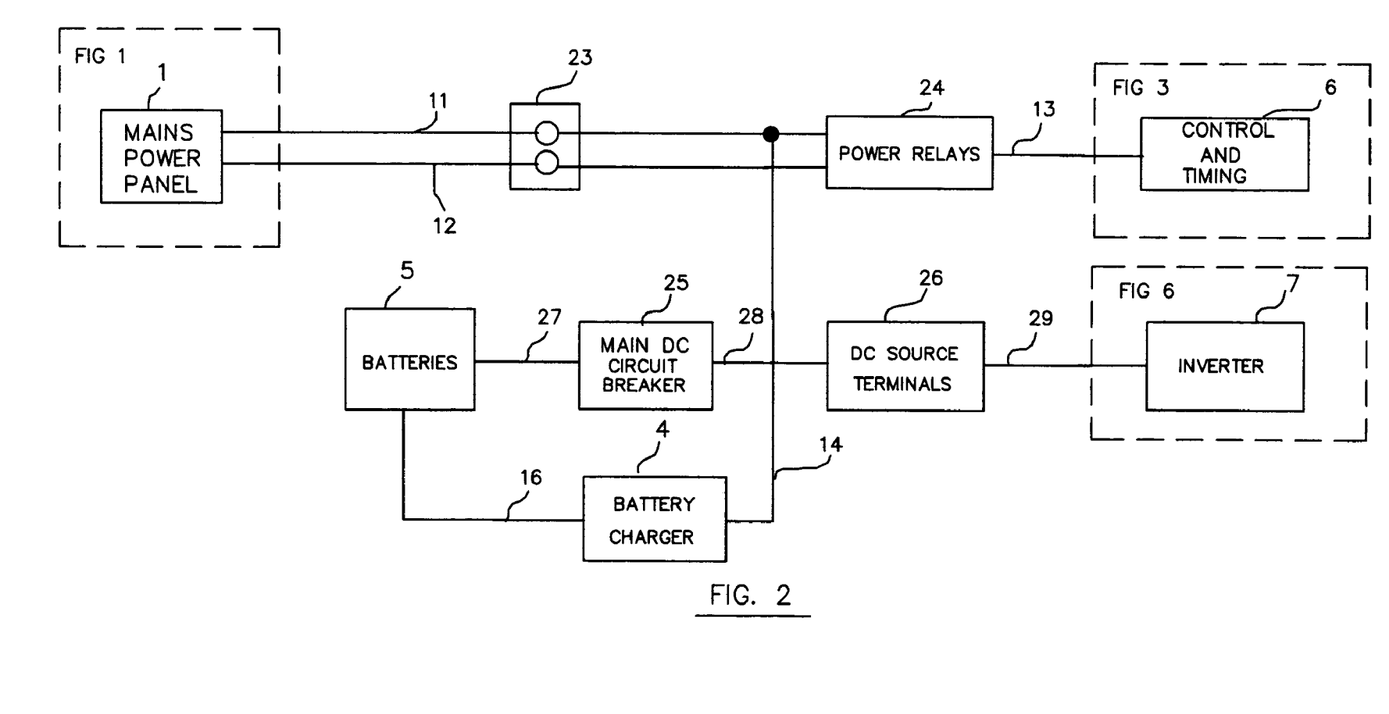
FIG. 2 illustrates the preferred embodiment of the power interface.
Figure 3:
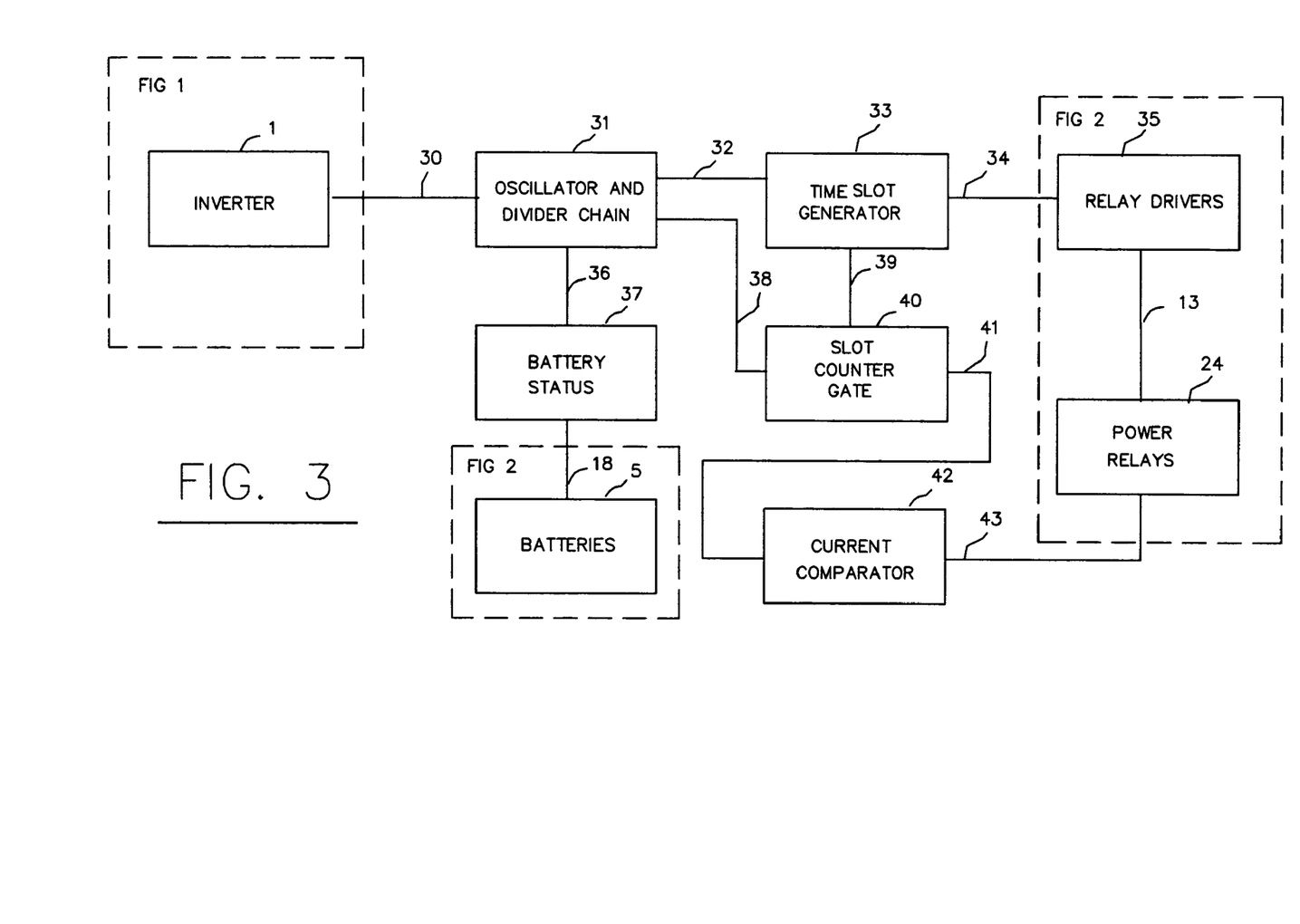
FIG. 3 illustrates the preferred embodiment of a portion of the control and timing logic.

Relays are individually selected by relay select lines 13 under control of control and timing logic 6, and are further described in FIGS. 2 and 3.

In the present invention, control and timing logic 6 comprises circuitry necessary to control and synchronize the occurrence of events in a timely fashion and to generate the frequency at which inverter 7 operates.

Battery charger 4 provides failure of primary power notification to the control and timing logic 6 by means of primary power failed signal 14, derived from one of the primary power input lines 11, which, under normal operation, is at 120 volts but reduces to zero (0) volts when primary power fails. Battery charger 4 serves to re-charge batteries 5 through battery charging voltage 16 when normal primary power is available The charge status of batteries 5 is continuously monitored by the voltage sensing logic 9, by means of battery output voltage 18, which is also used to provide operating voltage to all electronic circuitry. Battery status signal 22 is decoded by display 10 so as to provide an indication of the charge level of batteries 5.

When display 10 indicates that the battery voltage is at or near depletion, batteries depleted signal 22 signals control and timing logic 6 to inhibit further operation of inverter 7 by means of inverter enable/disable signal 19.

AC voltage generated by inverter 7 is coupled through current sensing logic 8 which measures the current flowing through backup power voltage 21 out to power interface 3 along backup load current sense lines 15.

FIG. 2 illustrates the preferred embodiment of power interface 3 in the present invention. Terminations for primary power input lines 11 and backup power output lines 12 are provided by AC interconnect terminals 23.

Power relays 24 comprise the preferred embodiment of the switching matrix. These relays are preferably electro-mechanical relays, however other types of relays may be used interchangeably, such as solid-state relays. Under normal conditions, primary power input lines 11 provide power through the normally-closed contacts of the relays and during power failure, backup power output lines 12 provide power through the normally-open (closed during power failure) contacts of power relays 24. At any given time one and only one of a plurality of power relays 24 is energized by the relay select lines 13. Thus, only one and only one of a plurality of appliances receives backup power.

In the present invention, main DC circuit breaker 25 serves a dual purpose. First of all, it provides batteries 5 protection from a possible short circuit within backup power system 2. Secondly, it serves as a shut off switch, stopping operation of the backup system. This is for safety concerns, such as during wiring external connections, testing components, and cleaning the apparatus and changing internal filters. The load side of main DC circuit breaker 25 provides DC source terminals 26 with inverter DC voltage input 29 to operate inverter 7.

FIG. 3 illustrates the circuitry that comprises control and timing logic 6. The basic components are oscillator and divider chain 31, time slot generator 33, battery status 37, slot counter gate 40 current comparator 42, (in FIG. 4) voltage reference 44, voltage comparator 46, inhibit operation gate 50, timing generator 31, LED drivers 48, and display 10.

Oscillator and divider chain 31 provides inverter frequency signal 30 (typically 60 Hz but may be any other standard frequency) and is controlled by inhibit operation signal 36 from battery status logic 37 which determines that the measured battery voltage is at or near depletion as determined by measurement of battery output voltage 18.

Outputs from oscillator and divider chain 31 include dwell time 32 and slot duration clock 38, wherein the dwell time (time allowed for each individual appliance to receive power) is pre-settable to suit individual applications, and the duration time marker is a clock for triggering purposes.

Time slot generator 33 determines the actual time period during which each individual power relay 24, of a plurality of relays, is energized, one and only one at a time, via relay drivers 35, each of which is selected one and only one at a time by its select one of "n" relays line 34.

All outputs of relay drivers 35 are normally high (logical "1"), and each output is driven low (logical "0") when time slot generator 35 drives one and only one of a plurality of power relays 24 into its energized state, thereby delivering backup power to its associated appliance.

Current comparator 42 preferably utilizes a current transformer to measure the current drawn via each individually selected power relay 24. Actual current measurement is made by passing backup power voltage lines 43 through the center of the current transformer (line current sensor 8, FIG. 5), amplifying the AC voltage developed across the secondary, rectifying it to obtain an equivalent DC value, and using this advance counter clock 41 signal to advance time slot generator 33 via slot counter gate 40.

Figure 5:
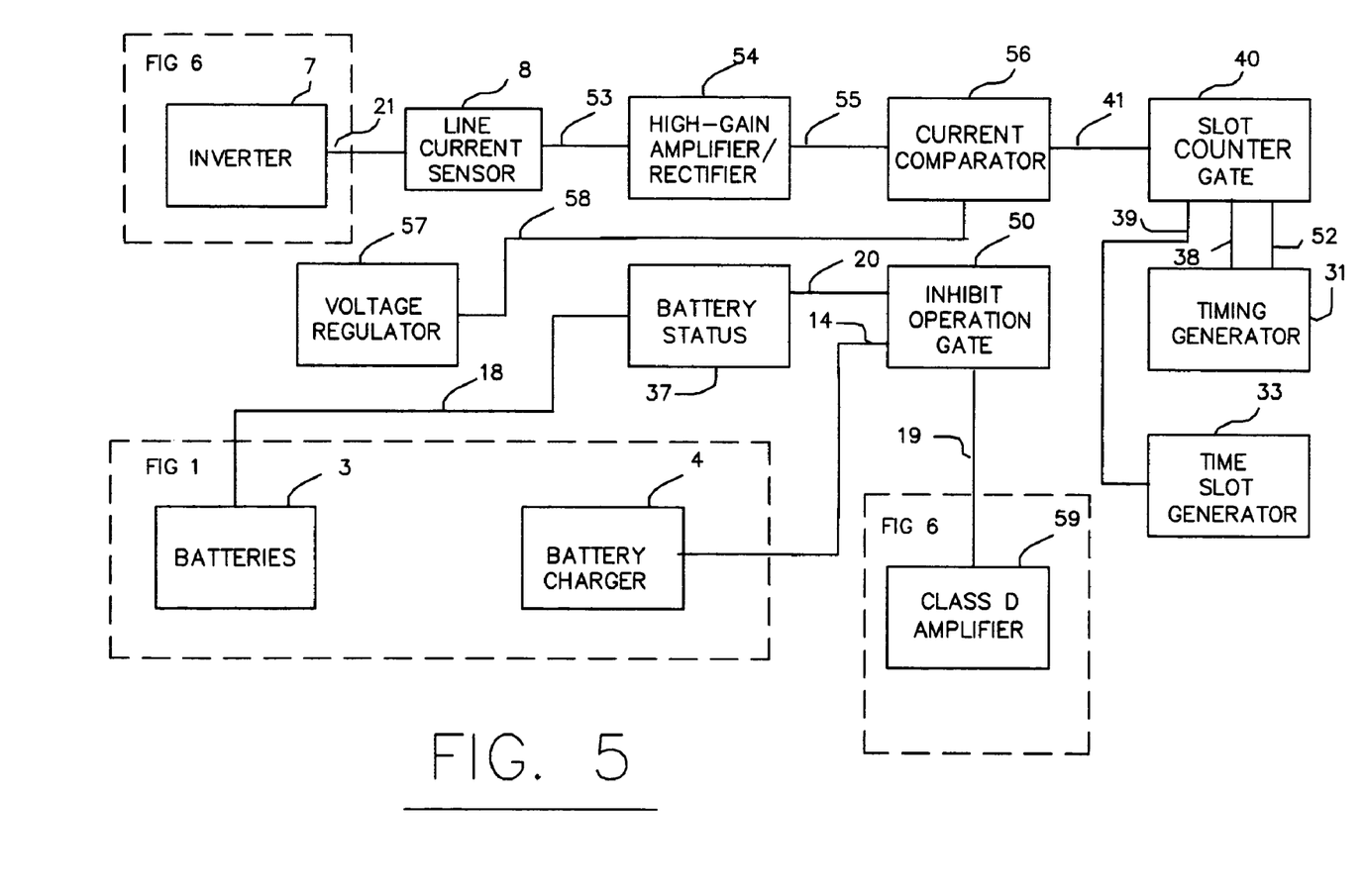
FIG. 5 illustrates the preferred embodiment of the appliance selection logic.

The control logic for advancing time slot generator 33 is covered in detail in FIG. 5 where all factors for selecting one and only one of a plurality of power relays 24 at a time are discussed in greater detail.

Figure 4:
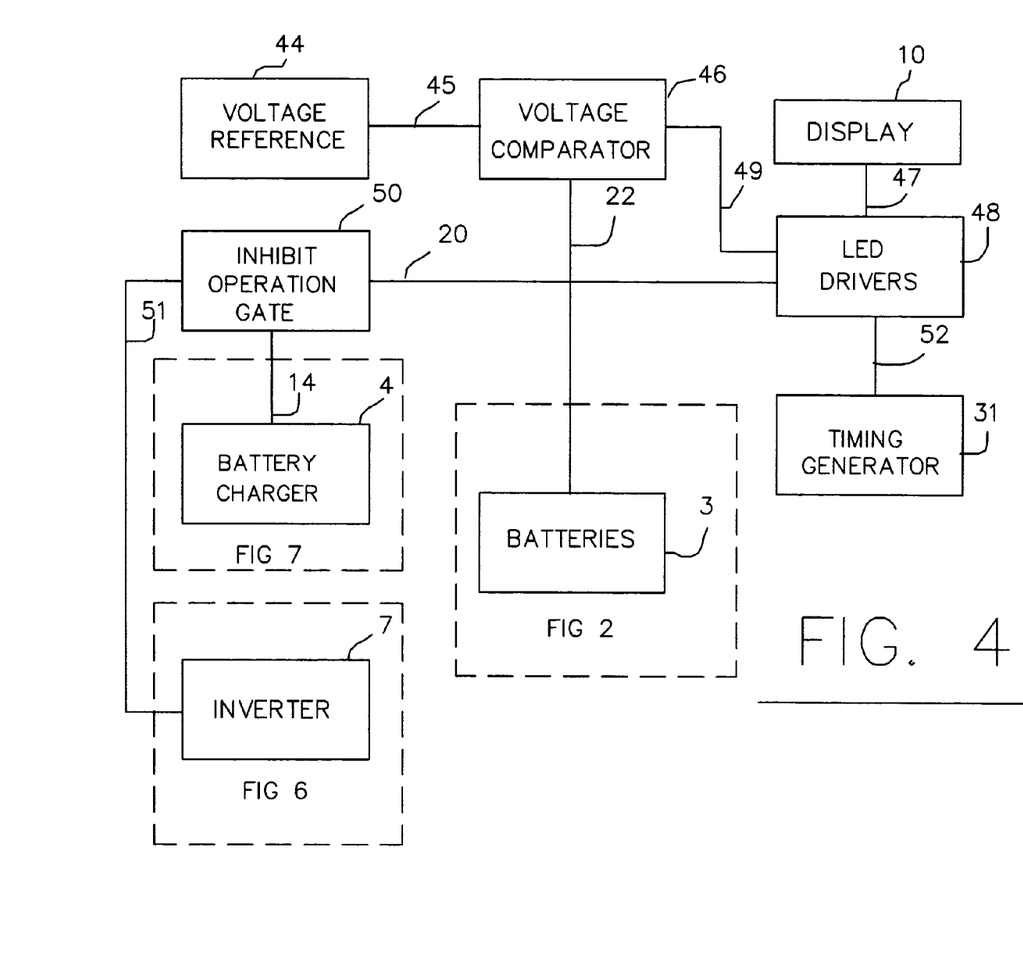
FIG. 4 illustrates the preferred embodiment of the battery status logic.

FIG. 4 is the present embodiment of the measurement and display logic for determining the state of charge of batteries 3, and the disable inverter signal 51 detected by LED drivers 48, used to inhibit further operation of inverter 7 when batteries 3 are at or near depletion.

Battery status signal 22 is applied to voltage comparator 46, which compares the battery voltage to a stable and accurate voltage reference 44 that generates voltage standard signal 45. The result of this comparison is voltage level signal 49 which is decoded by LED drivers 48 and displayed along display status lines 47 by display 10.

In the present embodiment of this invention, four LEDs are used to display the charge level of batteries 3 by means of bi-color (red/green) LEDs. This approach is by no means the only way to indicate battery voltage; this method was chosen because of simplicity and ease of use in typical installations. For example, other means considered are:

a. an analog DC voltmeter to read the voltage directly, or,     b. analog to digital conversion of voltage level signal 49 for display on a bar graph or LCD panel.

Since the client base for a backup power system most likely is typically a non-technical user, in this present embodiment four bi-color LEDs, representing charge levels of 100%, 75%, 50%, and 25% are used. With fully charged batteries, all LEDs glow green and when each lower level is reached, its LED changes from green to red. Batteries 3 are assumed to be at or near depletion when all LEDs glow red.

When the charge level drops below 25%, batteries depleted signal 20 is generated and used by inhibit operation gate 50 to inhibit inverter 7 by means of disable inverter signal 51.

Timing generator 31 provides system clock 52 to continually pulse LED drivers 48 in order to update the display when required by voltage level signal 49.

FIG. 5 displays the logic used to select one and only one of a plurality of appliances at a time for backup power, and to enable or disable inverter 7.

Central to this logic is slot counter gate 40; all other logic is peripheral to the decision making process.

As illustrated in FIG. 3, time slot generator 33 selects relay drivers 35 via relay select lines 34. In turn, slot counter gate 40 clocks time slot generator 33 via slot advance clock 39. Therefore, each time slot advance clock 39 occurs, time slot generator selects the next one and only one of a plurality of power relays 24 in sequence, such that one and only one power relay 24 is selected at a time, thereby delivering backup power only to the selected relay's assigned appliance.

Timing generator 31 provides synchronizing signals to slot duration clock 38 and system clock 52 to slot counter gate 40. These are housekeeping signals and unrelated to criteria dependent upon current drawn by each selected appliance.

Backup power voltage 21 from inverter 7 is preferably passed through current transformers that comprise line current sensor 8. This method was chosen since there is virtually no voltage drop across the primary of the transformers.

However, current sensor output 53 is normally in the 20 millivolt AC (minimum) range that must be amplified by high-gain amplifier/rectifier 54 to obtain sensed current DC level 55 signal for comparison by current comparator 56. Note that a gain of at least 100, minimum, must be obtained by high-gain amplifier/rectifier 54 and at an extremely low noise level to be usable. High gain is necessitated by the fact that forward conduction diode drops of typically 750 millivolts across diodes must be overcome in order to obtain usable measurements.

Voltage regulator 57 must be a stable and accurate voltage reference source in order to provide current calibration standard signal 58 for reference by current comparator 56.

Current comparator 56 is responsible for making three decisions, namely:

1. that the selected appliance is requiring power to be delivered,     2. that the power required is reasonable, and,     3. that no short circuits exist in backup power output line 12.

If the decision process yields an affirmative answer, then, and only then, will power be delivered to the one and only one of a plurality of selected appliances via its selected one and only one of a plurality of power relays 24.

Criteria 1 and 2, above, may be preset depending upon each particular installation. In the present embodiment, and depending upon empirical observations, it is assumed that at least 2 amperes AC, rms, must be drawn by any selected appliance before power will be delivered. This conclusion is based upon the fact that this is a backup power system for emergency use only and is not designed to power unnecessary items. The reasonable current draw capability is based upon typical appliances surveyed and found to be in the range of <10 amperes AC at 120 volts, rms, and <5 amperes AC at 240 volts, rms (typical for well pumps).

Criteria 3 pertains to possible short circuits detected at >10 amperes at 120 volts AC, rms, and >5 amperes at 240 volts AC, rms. This criteria is not subject to change (by increasing it) since inverter 7, in this present embodiment, is designed for 1200 VA, rms. Of course, the maximum power available can be increased at a corresponding increase in inverter size and battery capability.

FIG. 5 also shows the interconnections that control the generation of backup power, as follows:

1. Battery output voltage 18 is measured by battery status logic 37 which inhibits operation of inverter 7 when batteries 3 are at or near depletion as measured by batteries depleted signal 20.

2. Battery charger 4 provides primary power status information via primary power failed signal 14 that forms a second input to inhibit operation gate 50.

3. The output of inhibit operation gate 50 is inverter enable/disable signal 19 that controls generation of backup power from Class D Amplifier 59 that comprises the active element of inverter 7.

Figure 6:
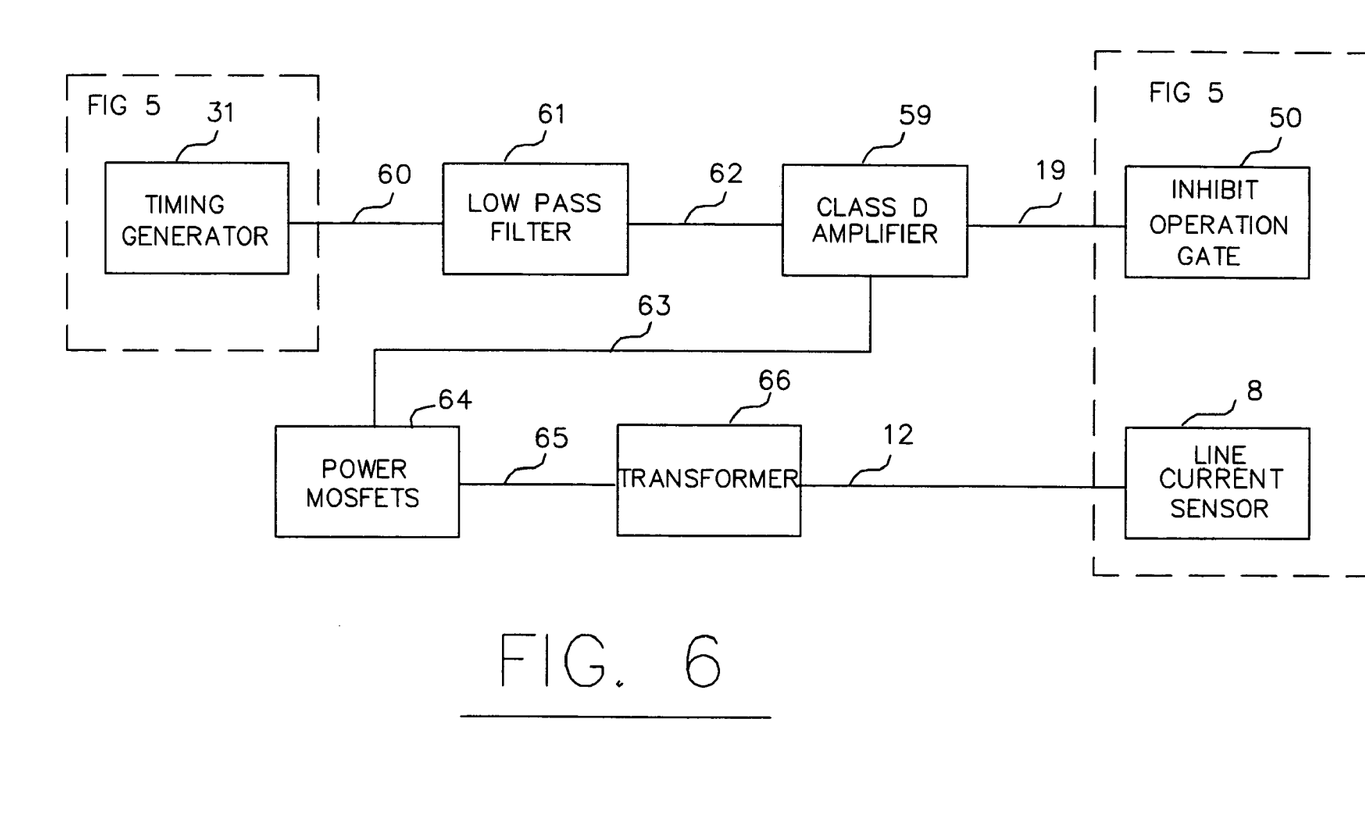
FIG. 6 illustrates the preferred embodiment of the inverter.

FIG. 6 displays the circuitry of inverter 7, and is comprised of four major components.

1. Timing generator 31 generates a 60 Hz square wave signal 60 that passes through low-pass filter 61, producing a 60 Hz sine wave signal 62.

2. Class D Amplifier 59, when enabled by inverter enable/disable signal 19, drives power mosfets 64 in a push-pull configuration, generating backup power.

3. Power mosfets 64 are selected for lowest gate to source resistance (typically <5 ohms) and high current capability, typically >100 amperes.

4. Drain connections of each power mosfet 64 are connected to opposite ends of a bi-filiar wound toroidal transformer 66 primary to ensure balance between each half of the primary and also for minimal flux leakage.

5. The secondary winding(s) of transformer 66 comprise the backup output voltage of inverter 7.

Figure 7:
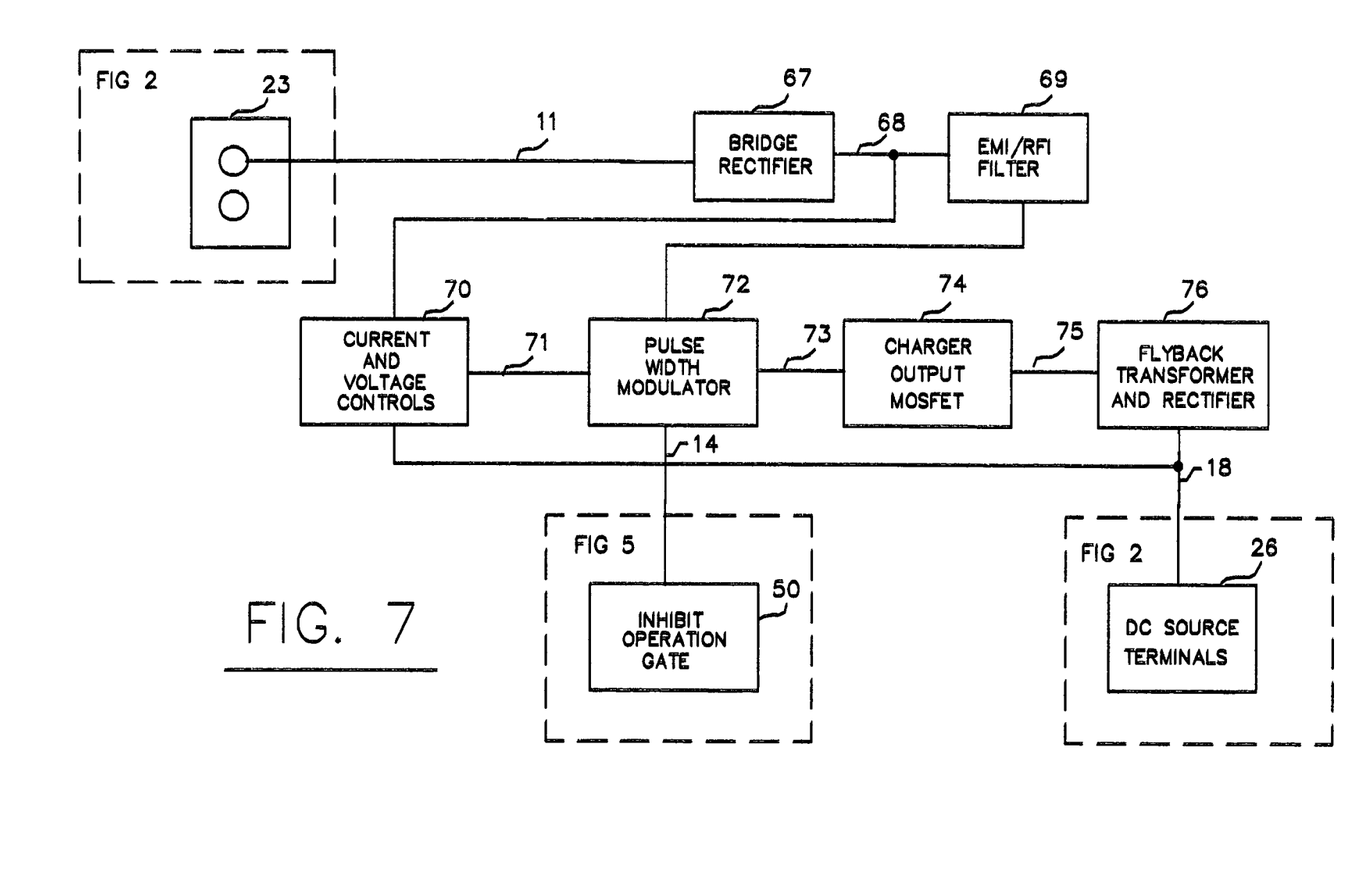
FIG. 7 illustrates the preferred embodiment of the battery charger.

FIG. 7 illustrates battery charger 4. This buck regulator is connected to primary power input lines 11 at AC interconnect terminals 23. Bridge rectifier 67 produces rectifier line voltage 68 that is then filtered by EMI/RFI Filter 69 so as to reduce or eliminate conducted spurious signals.

Current and Voltage Controls 70 examine battery output voltage 18 and rectified line voltage 68 and derive buck drive signals 71 in order to control pulse width modulator 72 that serves to provide output mosfet drive signal 73 to properly drive charger output mosfet 74, driving flyback transformer and rectifier 76 via flyback drive lines 75.

The purpose of battery charger 4 circuitry is to rapidly charge depleted batteries 5 and then float batteries 5 at the rated terminal voltage recommended by the battery manufacturer.

Inhibit operation gate 50 provides an on/off function, the state of which depends upon the status of the primary power source. This control is effected by primary power failed signal 14; under normal conditions, its voltage is at a logical "1" and goes to a logical "0" when a power failure is detected.

Figure 8:
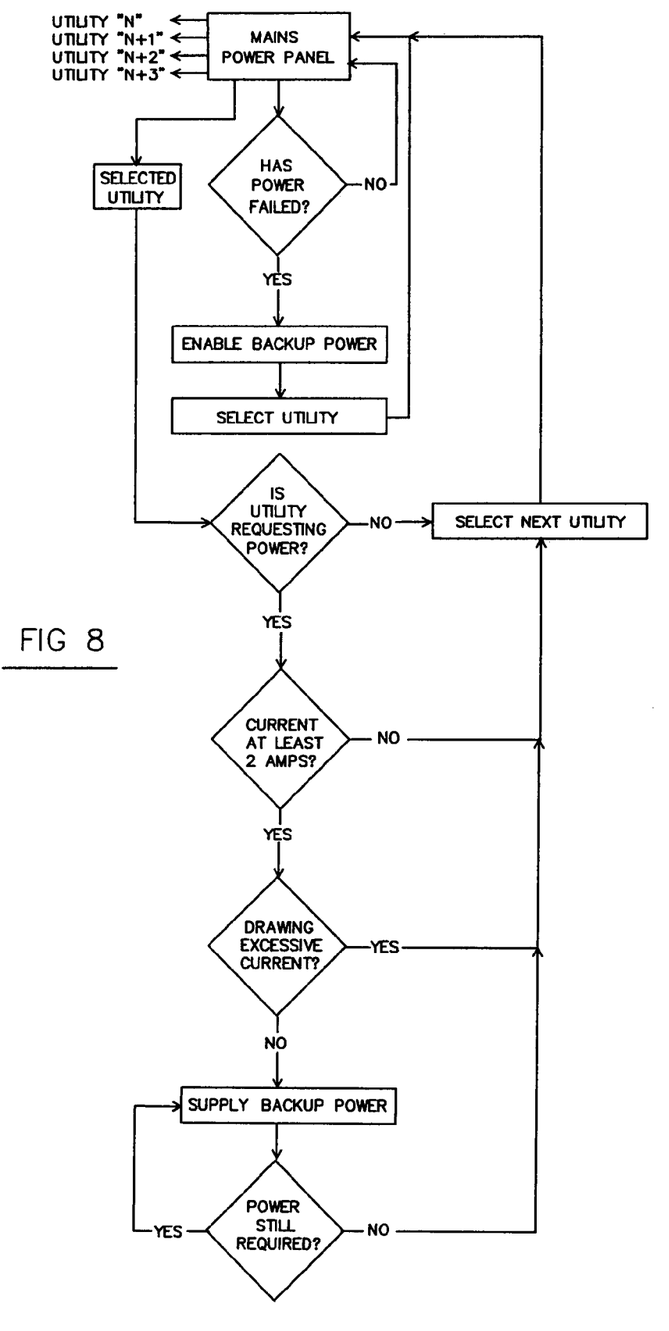
FIG. 8 is a flow chart illustrating the operation of the backup power system.

FIG. 8 is a flow chart of operations, depicting how the backup power system operates. Diamond shapes indicate tests performed; each test has a "yes" or "no" output. Rectangles represent action taken as a result of each test.

Main power is applied to the household power panel; shown are 4 utilities, N, N+1, N+2, N+3, although the system is not limited to 4 utilities. The terms "utility" and "appliance" are interchangeable in the context of this discussion.

The "Has power failed" test is performed continuously. Under normal conditions, the "no" output re-circulates back to the main panel. In the even a failure occurs, the test yields a "yes" answer and backup power is enabled, and simultaneously, one and only one of a plurality of appliances is selected.

The selected utility is further tested to ensure that power is being demanded. Consider a typical refrigerator wherein the ambient temperature is lower than the thermostat setting. In this case, no power is demanded, the test result is "no" and so the next utility is then selected. Had the ambient temperature been higher than the thermostat setting, then the test result would have been "yes" and power would be demanded.

Once a demand for power is sensed, a test is performed to ensure that at least 2 amperes of current is flowing to the utility. This is to ensure that only a necessary load is receiving power. If the test results in "no", then next utility is selected. A value of 2 amperes has been determined empirically and is easily resettable for a particular installation.

If the test result is "yes", then the current drawn is measured to ensure that there is no short circuit, in which case backup power is supplied, otherwise the next utility is selected. In the even a short circuit exists in the appliance being tested, then a protective device within the backup power system permanently opens the circuit to the utility.

Once power is being supplied to a selected utility, a test is continually performed to determine if power is still required. A "no" answer can occur if the ambient temperature, as in the previous example, becomes lower that the thermostat setting, or if the presettable power delivery time has expired. In either case, the next utility is selected and the entire process repeats, at least until primary power returns, or if batteries 5 become depleted, in either case of which the backup power system is turned off.

What is claimed is:

1. A backup power system for supplying electrical power in the event of primary power failure to one and only one of a plurality of household appliances at a time, said plurality of appliances each receiving power in a predetermined sequence under the direction of an automated control system, comprising:
    at least one battery;
    an inverter for converting a DC voltage of said battery to an AC voltage for supplying said backup power;
    voltage sensing circuitry for measuring said DC voltage level of said battery;
    current sensing circuitry for detecting and measuring each individual one of a plurality of current flows to each said appliances;
    a battery charger for recharging said battery;
    a visual display of a charge level of said battery;
    a power interface comprising a plurality of relays such that each one and only one of said relays is electrically connected to one and only one of said appliances at a time;
    and control and timing circuitry implementing a predetermined operation of said backup power system;
    wherein said predetermined operation comprises:
        supplying backup power to each said appliance for a respective individually programmable dwell time;
        controlling respective said relays to disconnect a first said appliance from said battery before a second said appliance is connected;
        determining if load current for each appliance is within predetermined parameters;
        controlling said relays to omit a said appliance if said load current demand is less than a predetermined level; and
        controlling a said relay to disconnect said backup power from a corresponding said appliance that is drawing excessive current.

2. A backup power system for supplying electrical power as in claim 1 wherein said visual display may comprise bi-color (red/green) LEDs as said charge level indicators of said batteries or preferably said visual display may comprise an LCD that not only graphically displays the function of said bi-color (red/green) LEDs but in addition said visual display may be used to set, change, or observe the operating parameters of said predetermined operation.

3. A backup power system for supplying electrical power as in claim 1
    wherein said predetermined operation may be altered by the owner/operator of said backup power system or may be reset to the original factory settings of said predetermined operational parameters.

4. A backup power system for supplying electrical power in the event of primary power failure to one and only one of a plurality of said household appliances at a time,
    wherein said current sensing circuitry comprises:
    a current transformer or equivalent, e.g., a Texas Instruments INA series solid-state current monitor, to input each said individual one of a plurality of current flows to each said appliance and output an AC voltage commensurate with each said individual one of a plurality of current flows;
    wherein said current sensor provides both minimum and maximum allowable limits of said individual one of a plurality of current flows in conjunction with said predetermined operation;
    an amplifier with an input to receive said transformer AC voltage and output a rectified DC voltage commensurate with said transformer voltage;
    and window comparators to receive the DC voltage, thereby serving as means for influencing said predetermined operation;
    wherein said predetermined operation comprises:
        supplying backup power to each said appliance for a respective individually programmable dwell time;
        controlling respective said relays to disconnect a first said appliance from said battery before a second said appliance is connected;
        determining if load current for each appliance is within predetermined parameters;
        controlling said relays to omit a said appliance if said load current demand is less than a predetermined level; and
        controlling a said relay to disconnect said backup power from a corresponding said appliance that is drawing excessive current.

* * * * *